US 8,208,716 B2

(12) United States Patent
Choi et al.

(10) Patent No.: US 8,208,716 B2
(45) Date of Patent: Jun. 26, 2012

(54) STEREO VISION SYSTEM AND STEREO VISION PROCESSING METHOD

(75) Inventors: Seung Min Choi, Daejeon (KR); Eul Gyoon Lim, Daejeon (KR); Jae Il Cho, Daejeon (KR); Dae Hwan Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 966 days.

(21) Appl. No.: 12/203,583

(22) Filed: Sep. 3, 2008

(65) Prior Publication Data
US 2009/0060280 A1 Mar. 5, 2009

(30) Foreign Application Priority Data
Sep. 3, 2007 (KR) .................. 10-2007-0089140

(51) Int. Cl.
*G06K 9/00* (2006.01)
(52) U.S. Cl. ...................... 382/154; 382/106
(58) Field of Classification Search .............. 382/154
See application file for complete search history.

(56) References Cited

U.S. PATENT DOCUMENTS

| 5,619,256 | A | * | 4/1997 | Haskell et al. .............. 348/43 |
| 6,055,012 | A | * | 4/2000 | Haskell et al. .............. 348/48 |
| 7,742,657 | B2 | * | 6/2010 | Kim et al. ................ 382/284 |
| 2004/0022320 | A1 | | 2/2004 | Kawada et al. | |

FOREIGN PATENT DOCUMENTS

| KR | 10-2002-0030451 | 4/2002 |
| KR | 10-2002-0053986 | 7/2002 |
| KR | 10-2003-0001758 | 1/2003 |
| KR | 10-2004-0006738 | 1/2004 |
| KR | 10-2006-0041060 | 5/2006 |
| KR | 10-2007-0025142 | 3/2007 |
| KR | 10-2007-0051275 | 5/2007 |

OTHER PUBLICATIONS

Roy et al. "Stereoscopic Analysis of Multiple Images" International Journal of Computer Vision, 1993.*
Jia et al."Stereoscopic Video Coding Based on Global Displacement Compensated Prediction" IEEE, Dec. 2003.*
Ding et al. "Stereo Video Coding System with Hybrid Coding Based on Joint Prediction Scheme." IEEE, 2005.*

* cited by examiner

*Primary Examiner* — Bhavesh Mehta
*Assistant Examiner* — Utpal Shah
(74) *Attorney, Agent, or Firm* — Staas & Halsey LLP

(57) ABSTRACT

A stereo vision system includes an image pre-processing unit for pre-processing the right and left images, and a stereo matching unit for carrying out stereo matching of the right and left images to acquire low-resolution distance information of the right and left images and high-resolution distance information of the right and left images upon detection of an object within a distance range through the low-resolution distance information.

34 Claims, 10 Drawing Sheets

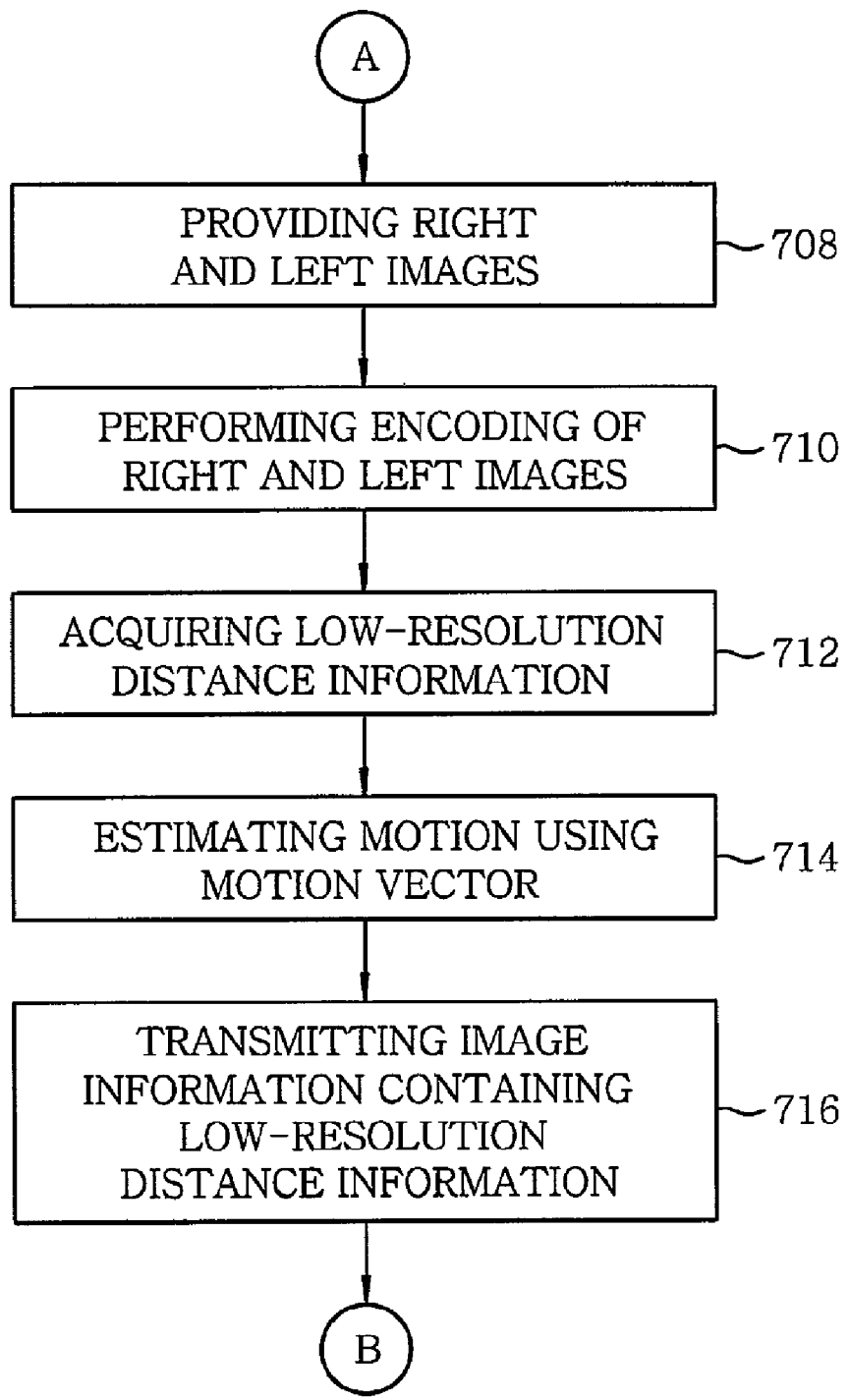

STEREO VISION SYSTEM AND STEREO VISION PROCESSING METHOD

CROSS-REFERENCE(S) TO RELATED APPLICATION

The present invention claims priority of Korean Patent Application No. 10-2007-0089140, filed on Sep. 3, 2007, which is incorporated herein by reference.

FIELD OF THE INVENTION

The present invention generally relates to a stereo vision system and, more particularly, to a stereo vision system and a stereo vision processing method suitable for acquisition of low-resolution distance information and high-resolution distance information using image compression, stereo matching, and stereo vision processing schemes.

This work was supported by the IT R&D program of MIC/IITA [2005-S-033-03, Embedded Component Technology and Standardization for URC].

BACKGROUND OF THE INVENTION

As well known in the art, stereo matching refers to a technology of extracting 3D image information from two images produced by two cameras installed on the right and left sides. The stereo matching enables direct calculation of a distance between the location of a camera and the actual location of a specific pattern by extracting a disparity, i.e. a difference between the location of the specific pattern in one image and the location of the specific pattern in another image, in the same principle as that of two eyes of a person for acquisition of information about a distance from a specific object or an image pattern.

However, unlike the principle of two eyes of a person that enables acquisition of information about a distance of the center portion of an entire image, stereo matching technique requires a large number of calculations because all information about distances from the entire image are calculated, and causes noise in an output disparity because the characteristics of images acquired by two cameras generally are not completely identical with each other and there may exist a dark area or an area where a specific pattern cannot be clearly discriminated in the images.

Meanwhile, a system suggested for processing of stereo matching includes two cameras each having an image sensor by which a digital image is captured, a pre-processing unit primarily processing two captured images, and a stereo matching unit.

In such a system, all processing other than the processing of two cameras may be carried out through embedded software in a personal computer in accordance with its purpose, or one or all of a preprocessing unit and a stereo matching unit may be manufactured using dedicated hardware. The former may easily use various algorithms but has a slow processing speed, and the latter may use only a specific limited algorithm but has a fast processing speed.

In particular, a stereo vision system using a stereo matching technology may be used in wide fields because it can acquire information about distances from all objects in an image, as compared with the other stereo matching technologies using only one image. For this reason, it has already been used or is expected to be used in a future in a vision unit of a robot, a collision prevention system of a vehicle, a game, and a military equipment, enabling acquisition of useful information.

Meanwhile, such a stereo vision system using a stereo is matching technology may be realized using software in a personal computer or a workstation when applied to a mobile system or may be realized using dedicated hardware logic on a field programmable gate array (FPGA). Currently, there are commercialized stereo vision systems such as 'Bumblebee' which is available from Point Grey Research Inc. in USA and 'Design STOC' that process stereo vision in a personal computer, which is available from Videre Design LLC in USA and 'DeepSea G2 Vision System' that processes stereo vision in a dedicated chip, which is available from Tyzx Inc. in USA.

Referring to FIG. 1, there is shown a process of processing stereo vision by a conventional stereo vision system. When right and left images are produced by right and left cameras in step 102, pre-processing of the right and left images is carried out to make brightnesses of the right and left images identical and epipolar lines thereof coincide with each other in step 104, stereo matching is carried out to create a disparity between pixels of the right and left images representing a same object in step 106, post-processing of distance information of the right and left images, such as a projection, a segmentation, and a filtering, is carried out in step 108 after removing noise from the disparity, and stereo image information is then acquired in step 110. In the above-mentioned process, information about the distance between an object and a background, and the shape and direction of the object may be utilized through the stereo image information.

In other words, the conventional stereo vision system acquires image information by carrying out pre-processing, stereo matching, and post-processing of a stereo image (i.e. right and left images). However, since such a conventional stereo vision system runs an algorithm in a personal computer or on an FPGA and is mounted to a mobile system, e.g., a robot, it requires high cost and high power consumption. Furthermore, when the conventional stereo vision system is embedded in the mobile system, it is necessary to always supply power to a stereo matching scheme of the stereo vision system in order for recognition of situation and navigation.

SUMMARY OF THE INVENTION

Therefore, it is an object of the present invention is to provide a stereo vision system and a stereo vision processing method that enable acquisition of lower resolution image information through an image compression and acquisition of high-resolution image information using stereo matching upon detection of an object from the low-resolution image information.

Another object of the present invention is to provide a stereo vision system and a stereo vision processing method that enable checking of calibration of a stereo camera using a motion vector created through an image compression and supply of information about the necessity of the camera calibration.

Yet another object of the present invention is to provide a stereo vision system and a stereo vision processing method that enable reduction of power consumption by supplying power necessary to perform a stereo matching only when high-resolution image information is acquired.

In accordance with an exemplary embodiment of the present invention, there is provided a stereo vision system for performing stereo matching a stereo image of right and left images captured by a stereo camera, which includes:

an image pre-processing unit for pre-processing the right and left images; and a stereo matching unit for carrying out stereo matching of the right and left images to acquire low-resolution distance information of the right and left images and high-resolution distance information of the right and left images upon detection of an object within a distance range through the low-resolution distance information.

In accordance with another exemplary embodiment of the present invention, there is provided a stereo vision processing method for carrying out stereo matching of a stereo image of right and left images captured by a stereo camera, which includes:

pre-processing the stereo image of the right and left images;

acquiring low-resolution distance information for the pre-processed stereo image of the right and left images;

checking detection of an object within a distance range using the low-resolution distance information; and performing a stereo matching on the right and left images to acquire high-resolution distance information, upon detection of the object.

Unlike a conventional technology in which distance information of stereo images is obtained through pre-processing, stereo matching, and post-processing of a stereo image, the present invention enables selective acquisition of low-resolution distance information obtained using an image compression module and high-resolution distance information obtained using a stereo matching module, by carrying out pre-processing of a stereo images, encoding a left image and a right image of the stereo image to a P-frame image and an I-frame image respectively using the image compression module, extracting a motion vector through the image compression module and acquiring low-resolution distance information, checking calibration of a stereo camera using the motion vector, acquiring high-resolution distance information using the stereo matching module upon detection of an object within a distance range through low-resolution distance information.

Furthermore, the present invention enables efficient power management by supplying power to the stereo matching module and permitting stereo matching by the stereo matching module only when an object is detected within a distance range through the low-resolution distance information and also enables checking a camera calibration on the basis of vertical components of a motion vector for the stereo image and supply of information about the necessity of the camera calibration.

In summary, the present invention enables acquisition of low-resolution distance information using a motion vector created through an image compression of right and left images of a stereo image, enables provision of a demand of a camera calibration through extraction of the motion vector for the right image, upon detection of an object within a distance range, enables acquisition of high-resolution distance information through a stereo matching, and enables reduction of power consumption due to selective use of the stereo matching, thereby solving problems occurring in conventional technologies.

BRIEF DESCRIPTION OF THE DRAWINGS

The above and other objects and features of the present invention will become apparent from the following description of embodiments given in conjunction with the accompanying drawings, in which:

FIGS. 7A and 7B is a flow chart illustrating a process of selectively acquiring low-resolution distance information and high-resolution information according to detection of an object in accordance with an embodiment of the present invention.

DETAILED DESCRIPTION OF THE EMBODIMENTS

Hereinafter, embodiments of the present invention will be described in detail with reference to the accompanying drawings.

Figure 1:
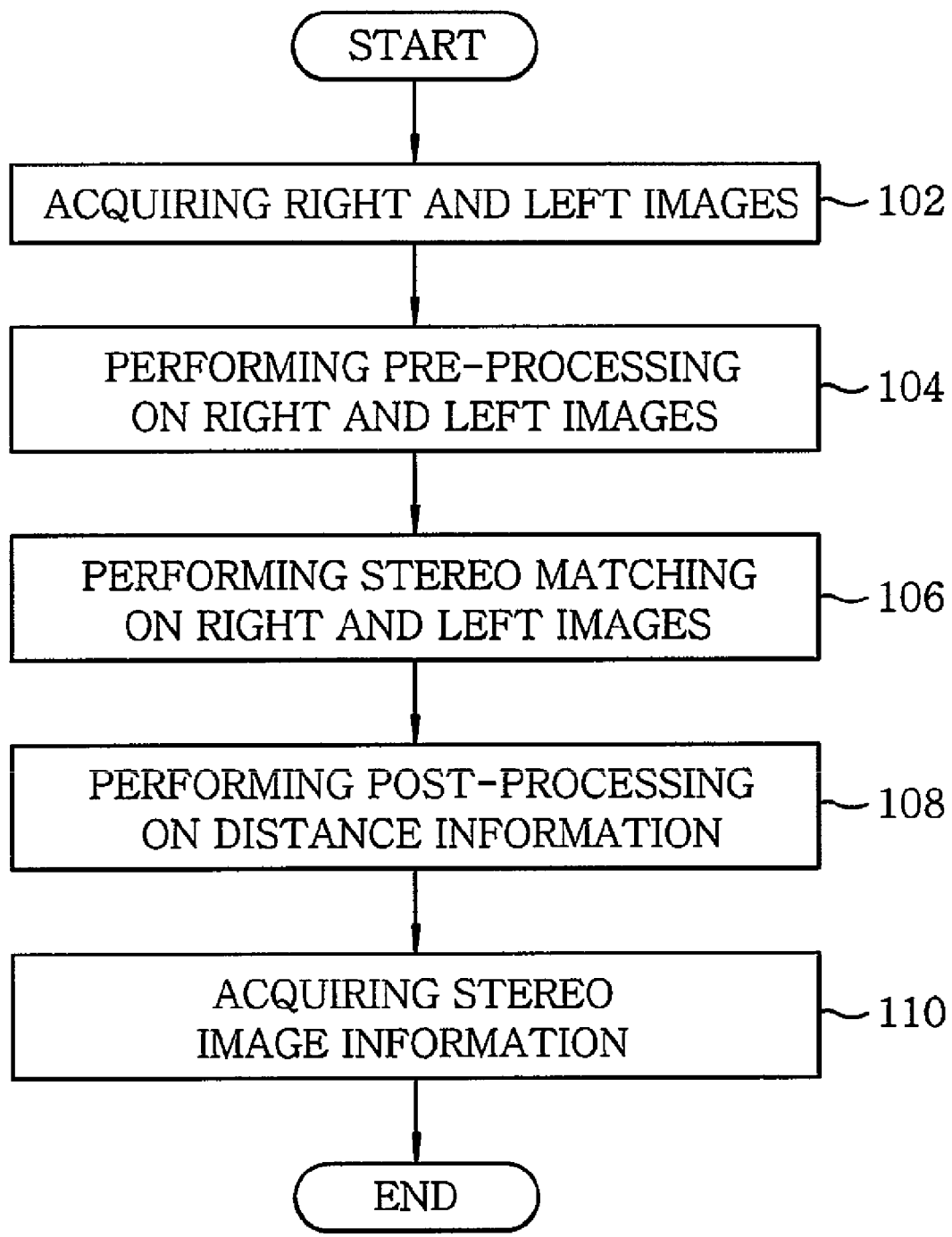
FIG. 1 is a flowchart illustrating a conventional stereo vision processing method of stereo images.
Figure 2:
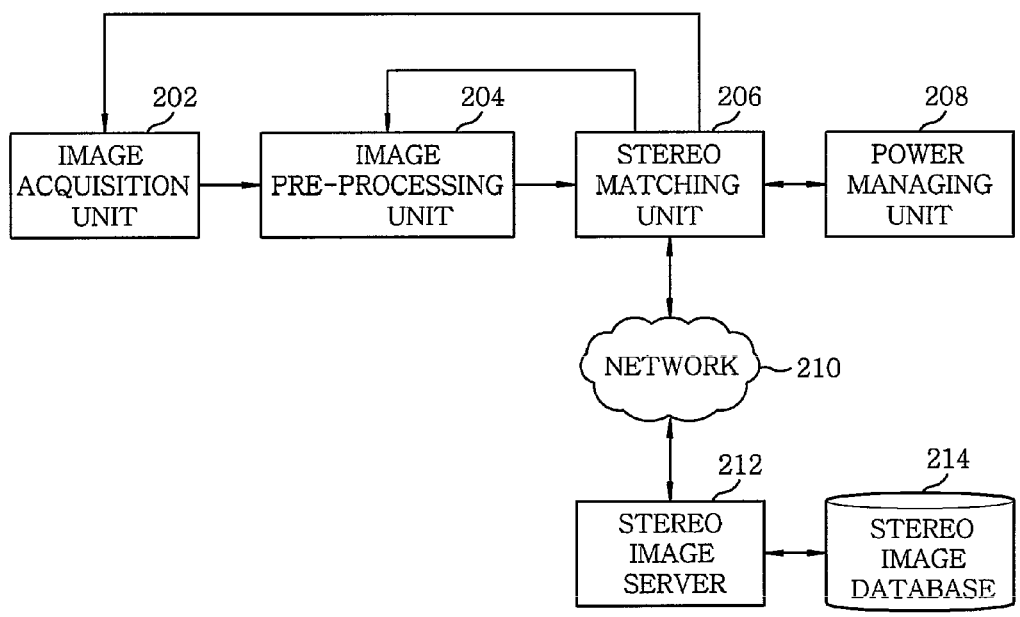
FIG. 2 is a block diagram illustrating a stereo vision system suitable for acquisition of low-resolution image information and high-resolution image information in accordance with an embodiment of the present invention.

FIG. 2 is a block diagram illustrating a stereo vision system suitable for acquisition of low-resolution image information and high-resolution image information in accordance with an embodiment of the present invention. The stereo vision system includes an image acquisition unit 202, an image processing unit 204, a stereo matching unit 206, a power managing unit 208, a camera calibrating unit 210, a network 212, e.g., LAN (local area network), a stereo imager server 214, and a stereo image database 216.

With reference to FIG. 2, the image acquisition unit 202 includes a stereo camera using a charge coupled device (CCD) module or a complementary metal oxide semiconductor (CMOS) module to photograph an object through right and left lenses of the stereo camera. Photographed images, which may include moving images, are converted by the CCD module or the CMOS module into electrical signals. In addition, the image acquisition unit 202 carries out a series of operations including adjustment of exposure, gamma, gain, white balance, and color matrix of the stereo camera, converts the electrical signals to digital signals through an analog-to-digital converter (not shown), and transfers the digital signals, which are a synchronized stereo image of right and left images, to the image pre-processing unit 204.

Figure 4A:
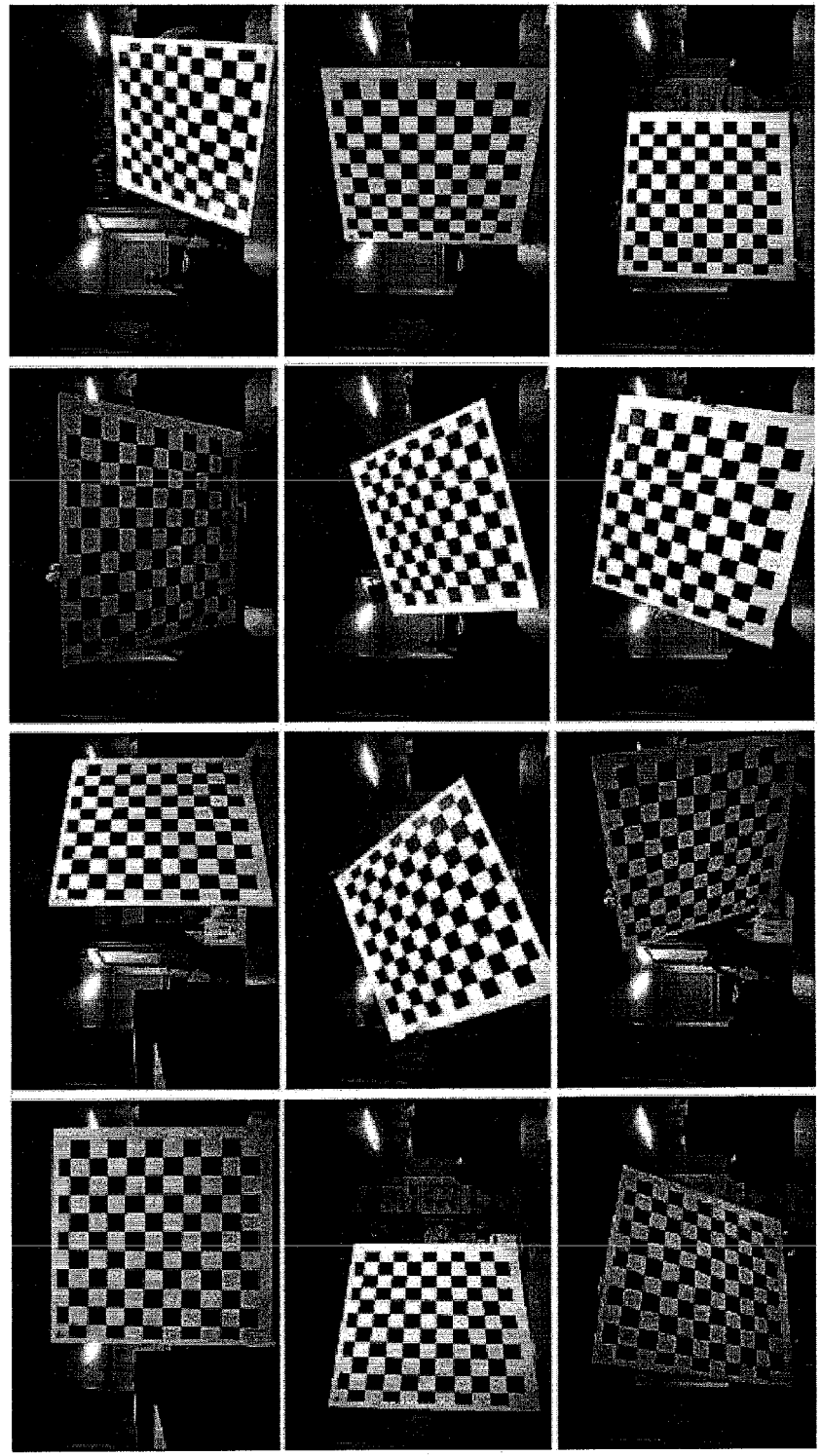
FIGS. 4A to 4C are views illustrating calibration of a stereo camera in accordance with an embodiment of the present invention.

Further, upon demand for calibration of the stereo camera from the stereo matching unit 206, the image acquisition unit 202 photographs a plurality of calibration patterns located in front of the stereo camera as shown in FIG. 4A. The photographed calibration patterns are then provided to the image pre-processing unit 204.

The image pre-processing unit 204 rectifies the stereo image of the right and left images using rectification S parameters, makes epipolar lines of the stereo image coincide with each other. That is, the image pre-processing unit 204 rectifies the stereo image of the right and left images using the rectification parameters of the stereo camera so that the epipolar lines are horizontal, corrects a difference between characteristics of right and left lenses of the stereo camera and a difference between brightnesses of the right and left images, and transfers the pre-processed stereo image to the stereo matching unit 206. In this connection, an epipolar line refers to a line of one image that corresponds to points of another image. The image pre-processing unit 204 extracts the rectification parameters using the rectification patterns located in front of the stereo cameras and parallel to baseline vectors of the stereo camera, and makes the epipolar lines of the stereo image horizontal using the rectification parameters at an initial stage.

Upon demand for calibration of the stereo camera the stereo matching unit 206, the image pre-processing unit 204 calibrates the right and left lenses of the stereo camera using the calibration pattern images provided from the image acquisition unit 202. In this case, the image pre-processing unit 204 extracts correspondence pairs for characteristic points of the pattern images as in FIG. 4B, and calibrates the stereo camera by matching the correspondence pairs using a direct linear transformation (DLT) as in FIG. 4C.

The stereo matching unit 206 includes an image compression module, i.e., an image compressor 302 and a stereo matching module, i.e., a stereo matcher 304 as will be discussed with reference to FIG. 3. The right and left images of the stereo image pre-processed through the image pre-processing unit 204 are alternately input into the image compression module, in which the right image is encoded to a P-frame and the left image is encoded to an T-frame, thereby enabling acquisition of low-resolution distance information, i.e., a coarse disparity, using a motion vector for the right image. Upon determination of depth values of the low-resolution distance information through estimation of the motion by the image compression module, the low-resolution distance information may be used in recognition and tracing through the stereo image.

Upon detection of an object within a distance range during performance of stereo vision using the low-resolution image information, the power managing unit 208 permits electrical power to supply to the stereo matching module of the stereo matching unit 206, and a P-frame, an I-frame, and a B-frame which are provided from the image pre-processing unit 204 are input to the stereo matching module. Then, a central disparity image is created by defining an imaginary image at the centers of the right and left images through the stereo matching module, thereby acquiring high-resolution distance information, i.e., a fine disparity, using the central disparity image. Upon determination of depth values of the high-resolution distance information through a motion estimation by the image compression module, the high-resolution distance information may be used in recognition and tracing through the stereo image.

Figure 3:
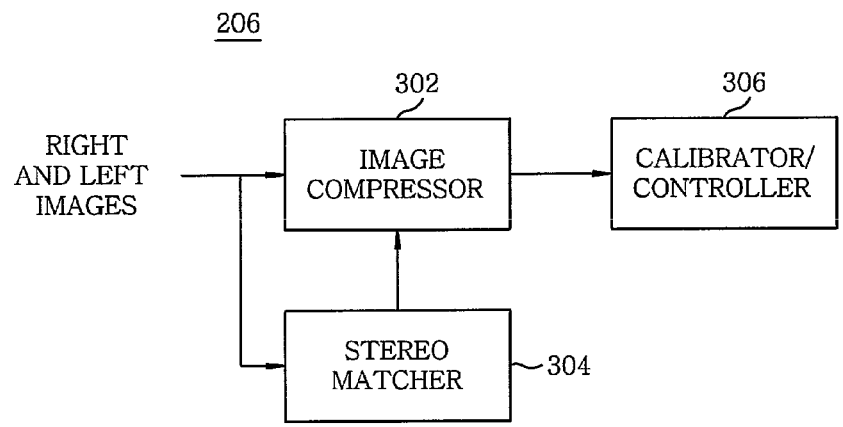
FIG. 3 is a detailed block diagram of a stereo matching unit shown in FIG. 2 to carry out stereo matching in accordance with an embodiment of the present invention.

FIG. 3 is a block diagram of the stereo matching unit 206 to carry out the stereo matching in accordance with an embodiment of the present invention. The stereo matching unit 206 includes an image compressor 302, a stereo matcher 304, and a calibrator/controller 306.

Figure 5:
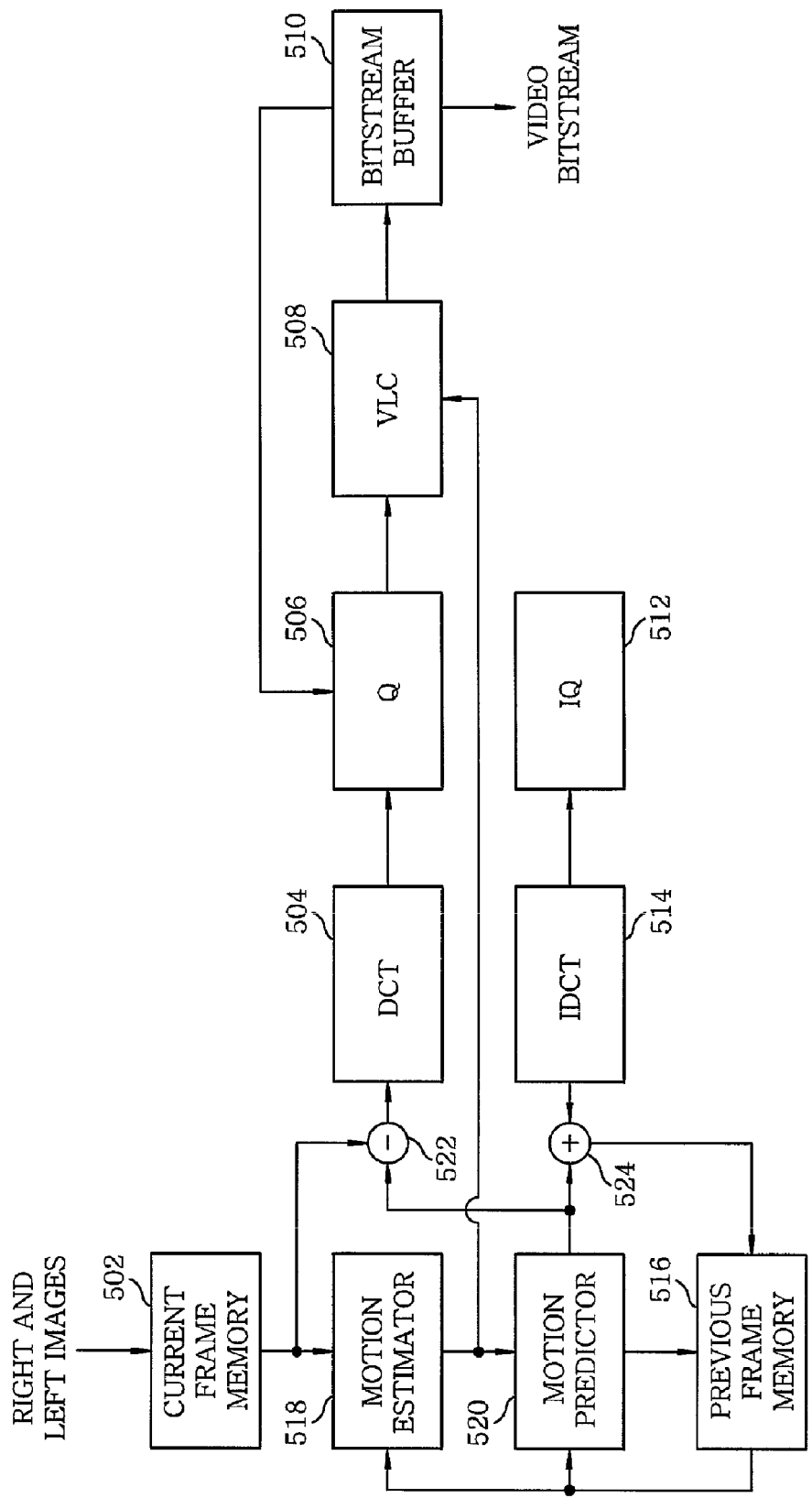
FIG. 5 is a block diagram of a moving picture encoder to encode a stereo image in accordance with an embodiment of the present invention.

The image compressor 302, which may include a moving picture image encoder such as H.264/MPEG4 AVC, encodes the right and left images of the stereo image to a P-frame referring only to a previous frame and an I-frame functioning as a reference frame image, respectively, through the use of a motion estimating technology. Example of the image compressor 302 is illustrated in FIG. 5. Following is a description of encoding of the right and left images through the image compressor 302 illustrated in FIG. 5. In the case of encoding of the left image to an I-frame, an nth frame of the left image is temporarily stored as a current frame in a current frame memory 502, the current frame image is subject to a discrete cosine transform (DCT) and a quantization by a discrete cosine transformer 504 and a quantizer 506. Thereafter, a variable length coding (VLC) is carried out to compress the quantized frame using a variable length coder 508 to produce the encoded I-frame. After performance of the variable length coding, the encoded I-frame is temporarily buffered in a bit-stream buffer 510 and then is output as a video bitstream. A quantization rate of the quantizer 506 is controlled by the bitstream buffer 510.

At the same time, the quantized frame is subject to an inverse quantization (IQ) and inverse DCT (IDCT), and is stored as a previous frame, i.e. an n-$1^{th}$ I-frame in a previous frame memory 516.

On the other hand, in the case of encoding the right image to a P-frame, the current image stored in the current frame memory 502 is transferred to a motion estimator 518, and a motion vector between the current frame and the previous frame, i.e., an n-$1^{th}$ P-frame, is extracted. The motion vector is transferred to the motion predictor 520 in which the current frame image is predicted using the motion vector. Then, subtraction between the motion predicted image whose motion has been predicted by the motion predictor 520 and the current frame is carried out in a subtractor 522 to produce a difference frame. The difference frame is then subjected to a DCT, a quantization and a a (VLC) to there by produce an encoded frame for the right image. The encoded frame is temporarily buffered in the bitstream buffer 510 and is then output.

At the same time, after performance of an inverse quantization and an inverse DCT (IDCT) of the image obtained by the quantization, the motion predicted image is added to the image which has been performed the IDCT 514 in a adder 524, and the added image is stored as a previous image, i.e. an (n-1)$^{th}$ P-frame in the previous frame memory 516.

Referring back to FIG. 3, the image compressor 302 decodes the P-frame of the right image using a variable length decoder (VLD), and extracting a motion vector for the right image and matches the motion vector with the I-frame of the left image, thereby acquiring the low-resolution distance information. When the pixel size of a macroblock to be processed in the moving picture encoder is 8 by 8, a disparity resolution of low-resolution distance information (i.e., the coarse disparity) is obtained by dividing the width and height of an original image by eight. For example, when an original image has a pixel size of 640 by 480, low-resolution distance information can be acquired to have a resolution of 80 by 60. Then, depth information of the disparity is determined according to the size of a horizontal search range window using a motion estimating technology.

The image compressor 302 transfers the low-resolution distance information containing the depth information of the disparity to the calibrator/controller 306. And, the image compressor 302 transfers the high-resolution distance information containing a disparity provided from the stereo matcher 304 to the calibrator/controller 306, which will be discussed hereinafter.

Upon detection of an object within a distance range using the low-resolution distance information, the stereo matcher 304 is supplied with power from the power managing unit 208, defines an imaginary image at the centers of the right and left images, creates a central disparity image, carries out the stereo matching to generate a disparity between pixels of the right and left images that have been determined to be a same object according to the central disparity image, and acquires the high-resolution distance information by carrying out a post-processing, such as projection, segmentation, and filtering with respect to the distance information of the right and left images. The high resolution distance information is transferred to the image compressor 302 to estimate a motion of the object. The stereo matcher 304 may carry out stereo matching of the right and left images of the stereo images using a dynamic program based stereo matching or block matching based stereo matching.

The calibrator/controller 306 determines the coincidence of epipolar lines of the stereo camera by analyzing vertical components of the motion vectors for the right and left images provided from the image compressor 302. When the epipolar lines do not coincide with each other, a display unit (not shown) displays demand for calibration of the stereo camera. Upon demand of calibration of the stereo cameras, a calibration control signal to calibrate the stereo camera is provided to the image acquisition unit 202 and the image pre-processing unit 204, and the low-resolution distance information and the high-resolution distance information that have been acquired through the image compressor 302 and the stereo matcher 306 are stored in an internal memory (not shown) or are transmitted to the stereo image server 214 through the network 210.

Upon failure in detection of an object within a distance range through the low-resolution distance information, the power managing unit 208 maintains a non-supply of power to the stereo matcher 304 of the stereo matching unit 206. However, upon detection of an object within a distance range through the low-resolution distance information, power is supplied to the stereo matcher 304 of the stereo matching unit 206 in response to a demand for power supply therefrom.

The stereo image server 212 is employed for storing and managing the right and left images. More particularly, the stereo image server 212 receives image information containing the low-resolution distance information or the high-resolution distance information transmitted through the network 210, and applies a database format to the image information as stereo image information so that the image information is stored and maintained in the data format.

As described above, the stereo vision system allows the stereo matching unit 206 including the image compressor 302 and the stereo matcher 304 to selectively acquire the low-resolution information and the high-resolution information of the right and left images according to the detection of an object within a distance range.

Hereinafter, a process of acquiring the low-resolution distance information by encoding the right and left images will be described in detail.

Figure 6:
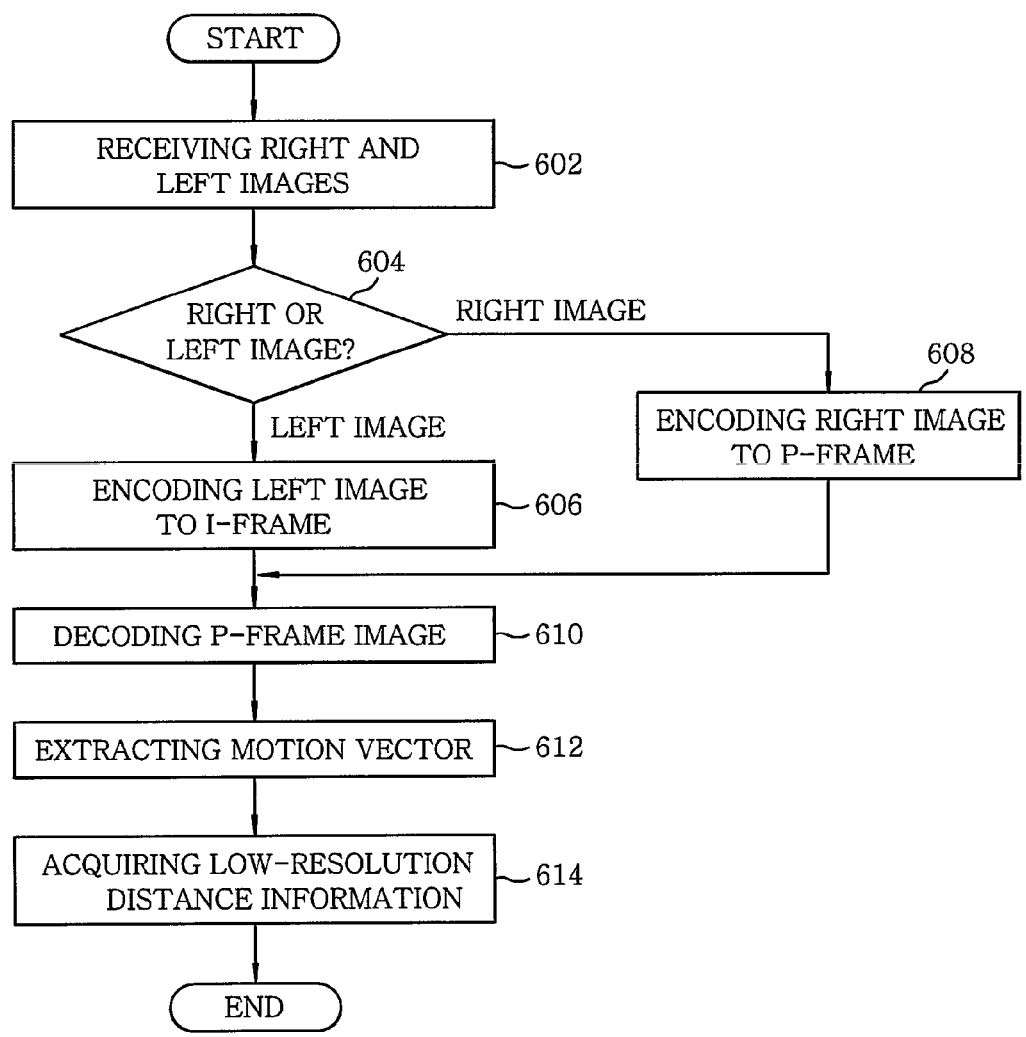
FIG. 6 is a flow chart illustrating a process of acquiring low-resolution distance information using an image compression in accordance with an embodiment of the present invention.

FIG. 6 is a flow chart illustrating a process of acquiring the low-resolution distance information using an image compression scheme in accordance with an embodiment of the present invention.

With reference to FIG. 6, upon receiving the right and left images through the stereo camera of the image acquisition unit 202, the right and left images is digitized and transferred to the image pre-processing unit 204. The image pre-processing unit 204 rectifies the stereo image of the right and left images using rectification parameters, makes epipolar lines of the stereo image of the right and left images coincide with each other, and provides the stereo images of the right and left images to the stereo matching unit 206 in step 602.

The stereo matching unit 206 classifies the stereo image of the right and left images in step 604. In case of the left image of the stereo image in step 604, the stereo matching unit 206 encodes the left image to an I-frame through the image compressor 302 in step 606. More particularly, the image compressor 302 of the stereo matching unit 206 encodes the left image by carrying out discrete cosine transform (DCT), quantization, and variable length coding (VLC), temporarily stores the compression result, and produces a video bitstream corresponding to the I-frame. At the same time, the image compressor 302 carries out an inverse quantization (IQ) and an inverse discrete cosine transform (IDCT) of the I-frame to which the quantization has been performed and stores the I-frame to which the IQ and IDCT has been performed as a previous I-frame for the left image.

Meanwhile, in step 604, in case of the right image of the stereo image, the stereo matching unit 206 encodes the right image to a P-frame through the image compressor 302 in 608. More specifically, the image compressor 302 of the stereo matching unit 206 transfers the right image to a motion estimator 518 where a motion vector is extracted. The motion vector is then transferred to the motion predictor 520 in which the current frame image is predicted using the motion vector. Then, subtraction between the motion predicted image whose motion has been predicted by the motion predictor 520 and the current frame is carried out in a subtractor 522 to produce a difference frame. The difference frame is then subjected to a DCT, a quantization and a VLC to thereby produce an encoded frame for the right image. The encoded frame is temporarily buffered in the bitstream buffer 510 and is then output. At the same time, after performance of an inverse quantization and an inverse DCT (IDCT) of the image obtained by the quantization, the motion predicted image is added to the image which has been performed the IDCT 514 in a adder 524, and the added image is stored as a previous image in the previous frame memory 516.

The image compressor 302 of the stereo matching unit 206 decodes the encoded P-frame image for the right image using a variable length decoder (VLD), and extracts a motion vector for the right image in steps 610 and 612. It may be seen which macroblock of the left image is matched with a macroblock to be processed in the image compressor 302 through a horizontal component of the motion vector, wherein the macroblock to be processed generally has multiple pixel sizes, e.g., 4 by 4, 8 by 8, and 16 by 16 pixel sizes.

Thereafter, when the size of the macroblock to be processed in the image compressor 302 is 8 by 8, a disparity resolution of the low-resolution distance information (i.e., a coarse disparity) is obtained by dividing the width and height of an original image by eight by eight in step 614. In this regard, one disparity is acquired per macroblock so that distance information with lower resolution can be obtained than in comparison to a prior art of obtaining a disparity by calculating and acquiring values for all pixels.

Accordingly, upon receiving the right and left images in the stereo vision system, the right image is encoded to a P-frame and left image is encoded to an I-frame, and a motion vector is extracted by decoding the encoded P-frame that is matched with the I-frame for the left image to acquire the low-resolution distance information.

Figure 7A:
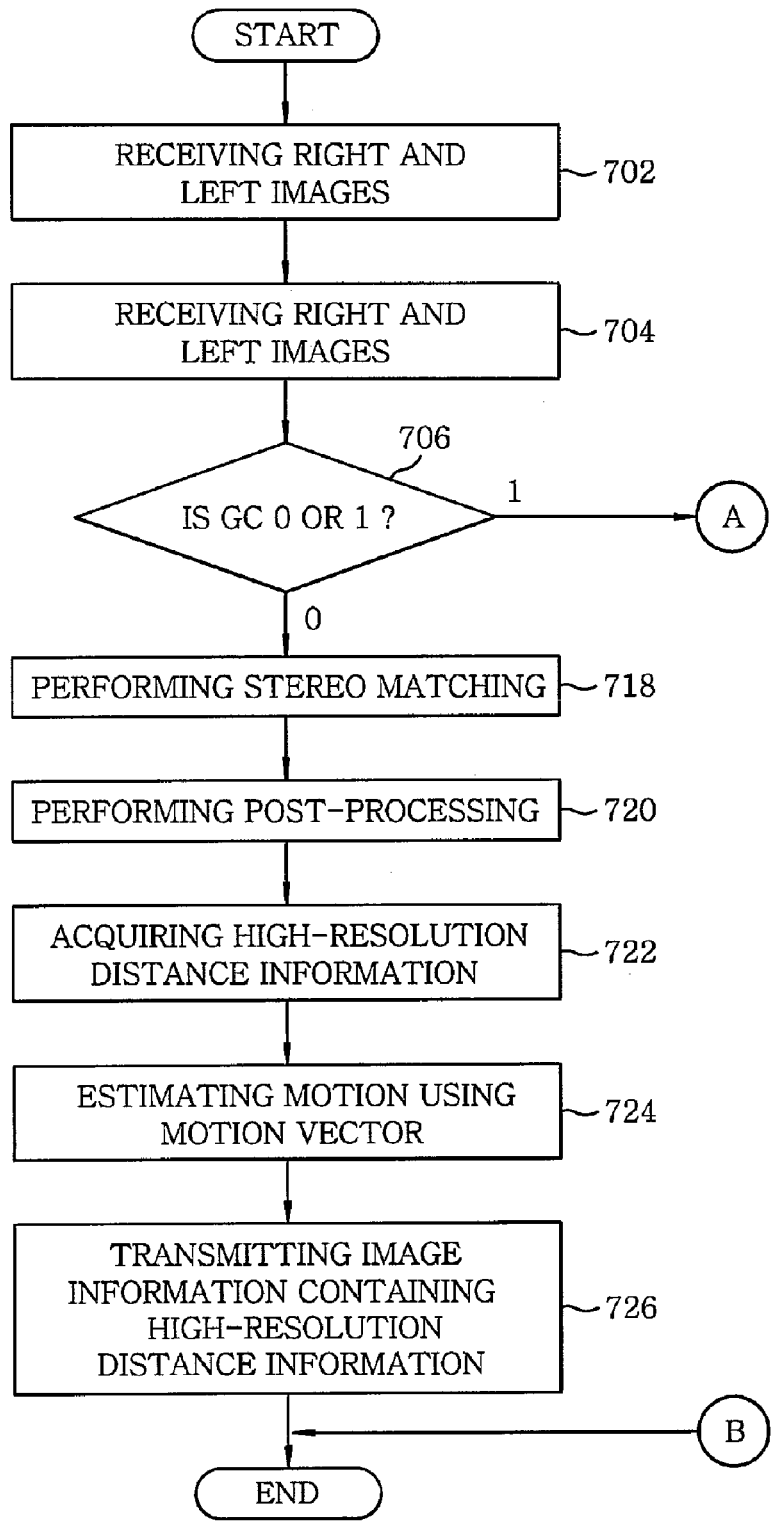

FIGS. 7A and 7B are a flow chart illustrating a process of selectively acquiring the low-resolution distance information and the high-resolution information according to detection of an object in accordance with an embodiment of the present invention.

With reference to FIG. 7A, upon receipt of right and left images of stereo image through the stereo camera of the image acquisition unit 202, the right and left images are digitized and transferred to the image pre-processing unit 204 in step 702.

The image pre-processing unit 204 rectifies the stereo image of the right and left images using rectification parameters, makes epipolar lines of the stereo image of the right and left images coincide with each other, and provides the preprocessed stereo image of the right and left images to the stereo matching unit 206 in step 704.

Thereafter, the stereo matching unit 206 checks whether a granularity condition (GC) is '0' or '1' in step 706. In this case, the GC of '0' indicates the detection of an object within a distance range and acquisition of the high-resolution distance information, and the CC of '1' indicates acquisition of the low-resolution distance information.

In case of the GC of '1', a control process goes to step 708, shown in FIG. 7B, through a tab 'A' where the preprocessed right and left images are provided to the image compressor 302 of the stereo matching unit 206.

The image compressor 302 encodes the left image to an I-frame or encodes the right image to a P-frame in step 710.

Further, the image compressor 302 decodes the encoded P-frame of the right image through the VLD, and extracts a motion vector for the right image, and acquires the low-resolution distance information having a resolution according to the size of the macroblock to be processed in the moving compressor 302 using the extracted motion vector in step 712. In this case, one disparity is acquired per a macroblock so that distance information with lower resolution can be obtained in comparison to a prior art of obtaining a disparity by calculating and acquiring values for all pixels.

Thereafter, the image compressor 302 estimates the motion of an object using the motion vector for the acquired low-resolution distance information in step 714, and transfers the low-resolution distance information to the calibrator/controller 306. The calibrator/controller 306 transmits image information containing the low-resolution distance information to the stereo image server 212 through the network 210. The stereo image server 212 applies a database format to the image information as stereo image information for storing and managing thereof in step 716.

Figure 4B:
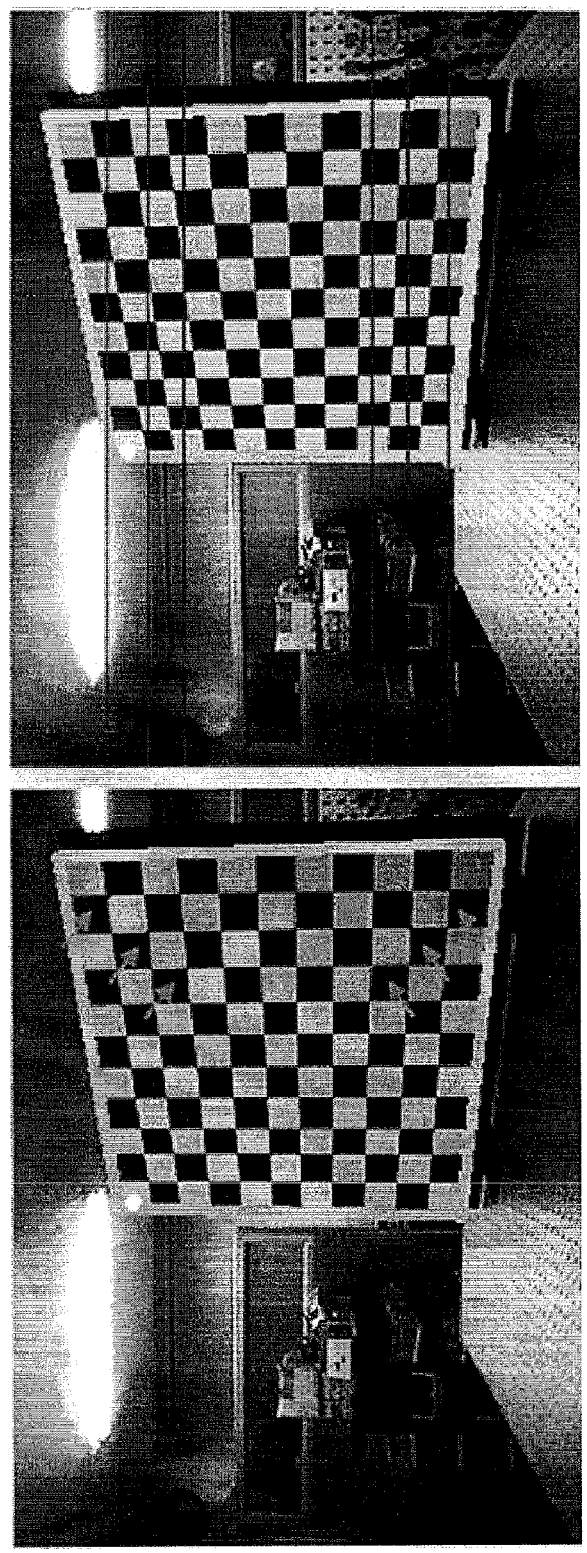
Figure 4C:
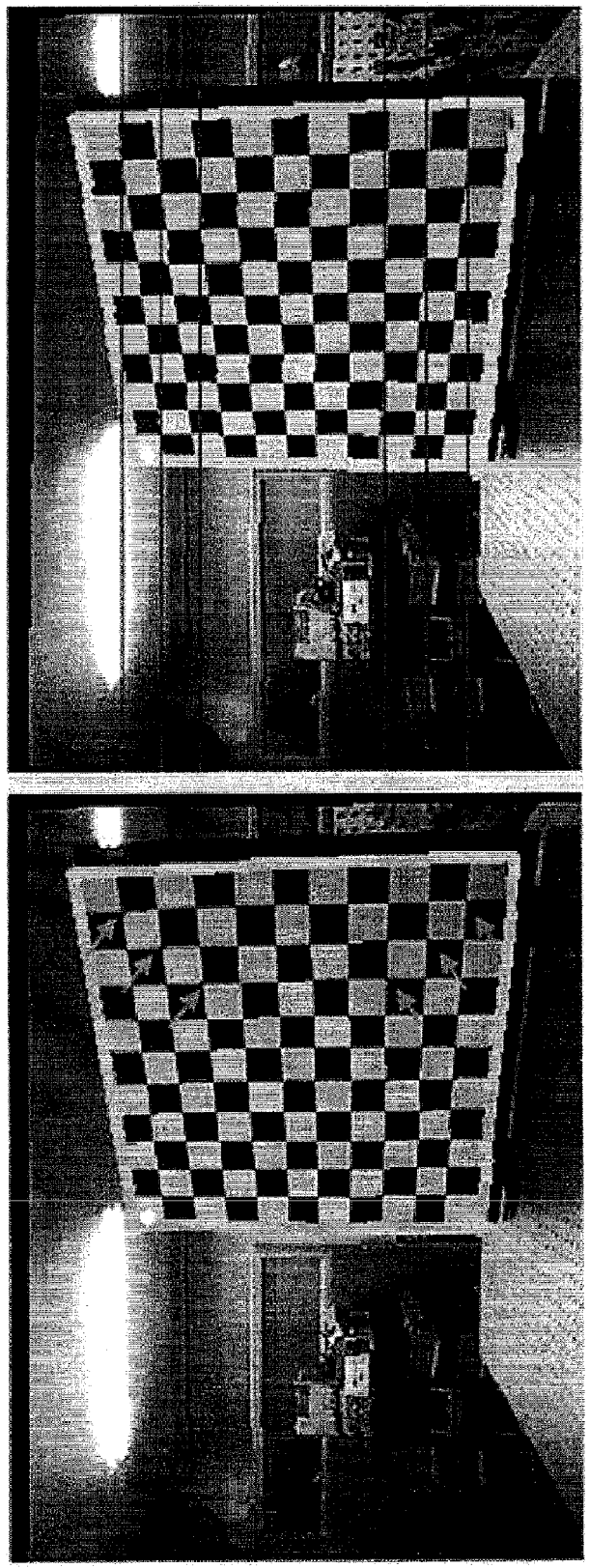

The calibrator/controller 306 determines the coincidence of epipolar lines of the stereo camera by analyzing a vertical component of the motion vector of the low-resolution distance information. If the epipolar lines of the stereo camera do not coincide with each other, the calibrator/controller 306 displays the necessity of calibration of the stereo camera on the display unit (not shown) to carry out the calibration of the stereo camera. If there is a demand for calibration of the stereo camera, the calibrator/controller 306 provides a calibration control signal to the image acquisition unit 202 and the image pre-processing unit 204. Accordingly, the image pre-processing unit 204 calibrates the right and left lenses of the stereo camera using the plurality of the calibration patterns, as illustrated in FIG. 4A, transferred from the image acquisition unit 202. In this case, the image pre-processing unit 204 extracts correspondence pairs for characteristic points of a plurality of calibration patterns, as illustrated in FIG. 4B, and calibrates the stereo cameras by matching the correspondence pairs using DLT (Direct Linear Transformation), as depicted in FIG. 4C.

On the other hand, in step 706 shown in FIG. 7A, in case of the GC of '0', the stereo matching unit 206 provides the right and left images from the image pre-processing unit 204 to the stereo matcher 304. The stereo matcher 304 defines an imaginary image at the centers of the right and left images through the stereo matching scheme, creates a central disparity image, and carries out a stereo matching to generate a disparity between pixels of the right and left images that are determined to be the same object according to the central disparity image, in step 718. In this case, the stereo matcher 304 may carry out a stereo matching of the stereo image of the right and left images using, for example, a dynamic program based stereo matching or a block matching based stereo matching.

Subsequently, the stereo matcher 304 carries out post-processing, such as projection, segmentation, and filtering, of the right and left images, acquires the high-resolution distance information superior to the low-resolution distance information through the image compression scheme, and transfers the high-resolution distance information to the image compressor 302, in steps 720 and 722.

Thereafter, the image compressor 302 estimates a motion of an object using the motion vector of the acquired high-resolution distance information in step 724, and transfers the high-resolution distance information to the S calibrator/controller 306. The calibrator/controller 306 transmits image information containing the high-resolution distance information to the stereo image server 212 through the network 210. The stereo image server 212 applies a database format to the image information as stereo image information for storing and managing thereof, in step 726.

Accordingly, the stereo vision system acquires the low-resolution distance information and the high resolution distance information through the image compressor pursuant to the GC, and after carrying out the motion estimation using the motion vector of the distance information, transmits the low-resolution distance information or the high-resolution distance information to the stereo image server for storing and managing thereof.

Figure 8:
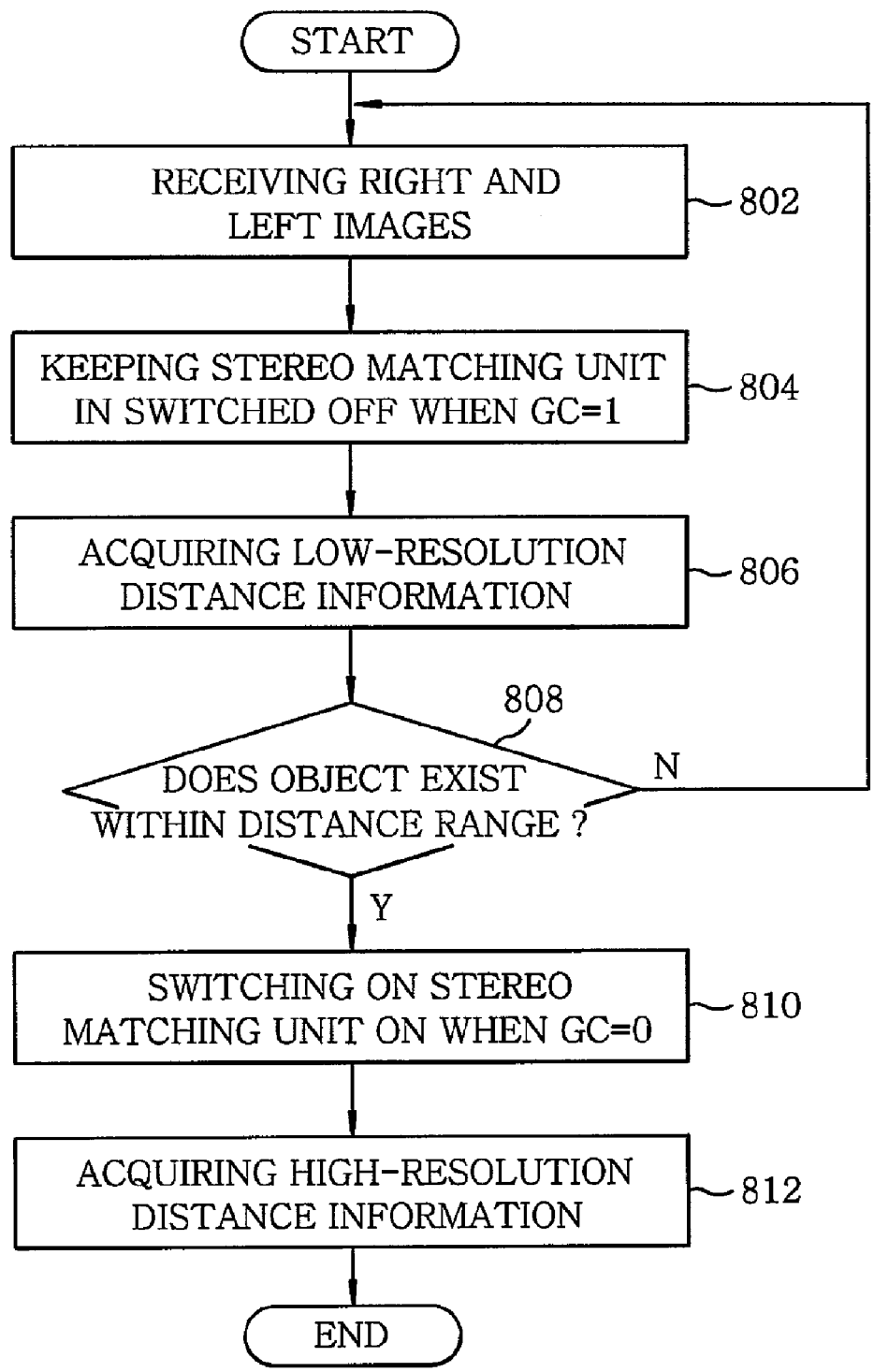
FIG. 8 is a flow chart illustrating a process of acquiring high-resolution distance information by supplying power according to detection of an object using low-resolution distance information in accordance with an embodiment of the present invention.

FIG. 8 is a flow chart illustrating a process of acquiring the high-resolution distance information by supplying power according to the detection of an object within the low-resolution distance information in accordance with an embodiment of the present invention.

With reference to FIG. 8, upon receipt of the stereo image of the right and left images through the stereo camera of the image acquisition unit 202, the image acquisition unit 202 transfers the right and left images to the image pre-processing unit 204. The image pre-processing unit 204 rectifies the stereo image of the right and left images using rectification parameters, makes epipolar lines of the stereo image of the right and left images coincide with each other and provides the pre-processed stereo image of the right and left images to the stereo matching unit 206, in step 802.

Thereafter, the stereo matching unit 206 keeps a power to the stereo matcher 304 switched off according to a condition of GC of '1'. In this case, the GC of '0' indicates the detection of an object within a distance range of the low-resolution distance information and the acquisition of the high-resolution distance information, and the GC of '1' indicates the acquisition of the low-resolution distance information.

The stereo matching unit 206 encodes the right image to a P-frame and the left image to an I-frame through the image compressor 302, decodes the encoded P-frame of the right image through the VLD, extracts a motion vector for the right image, and acquires the low-resolution distance information having a resolution according to the size of a macroblock to be processed in the image compressor 302 using the extracted motion vector, in step 806. In this case, one disparity is acquired per a macroblock so that distance information of the lower resolution can be obtained in comparison to a prior art of obtaining a disparity by calculating and acquiring values for all pixels.

Meanwhile, the image compressor 302 of the stereo matching unit 206 transfers the low-resolution distance information to the calibrator/controller 306, and checks detection of an object within a distance range of the low-resolution distance information, in step 808.

Upon failure in the detection of the object within the distance range, a process goes to the steps 802 to 806 and repetitively performs the acquisition of the low-resolution distance information through the image compressor 302.

On the other hand, upon detection of an object within a distance range of the low-resolution distance information, the calibrator/controller 306 makes a request for power supply to the power managing unit 208. In response to the request, the power managing unit 208 supplies the power to the stereo matcher 304 of the stereo matching unit 206 to switch on it according to a condition of the GC of '0'.

Thereafter, the stereo matcher 304 defines an imaginary image at the centers of the right and left images, creates a central disparity image, carries out a stereo matching to generate a disparity between pixels of the right and left images that have been determined to be the same object according to the central disparity image, and acquires the high-resolution distance information by carrying out post-processing, such as projection, segmentation, and filtering, of the distance information of the right and left images, in step 812. In this case, the stereo matcher 304 may carry out stereo matching of the right and left images using, for example, a dynamic program based stereo matching or a block matching based stereo matching.

Therefore, the stereo vision system of the present invention acquires the low-resolution distance information through an image compression scheme, and upon detection of an object within a distance range using the low-resolution distance information, supplies a power to the stereo matching unit and acquires the high-resolution distance information, thereby enabling efficient management of the power through the use of the selective supply of power to the stereo matching unit.

While the invention has been shown and described with respect to the exemplary embodiments, it will be understood by those skilled in the art that various changes and modifications may be made without departing from the scope of the invention as defined in the following claims.

What is claimed is:

1. A stereo vision system for performing stereo matching a stereo image of right and left images captured by a stereo camera, the stereo vision system comprising:
    an image pre-processing unit for pre-processing the right and left images; and
    a stereo matching unit for acquiring low-resolution distance information of the right and left images and high-resolution distance information of the right and left images, the stereo matching unit including:
        an image compressor for encoding the right image to a P-frame and the left image to an I-frame image, and acquiring the low-resolution distance information using the motion vector for the P-frame;
        a stereo matcher for acquiring the hiqh-resolution distance information, upon detection of an object within a distance range through the low-resolution distance information; and
        a calibrator/controller for detecting the object within the distance range based on the motion vector, making a demand for power supply to the stereo matching unit from the power managing unit, and acquiring calibration information for the stereo camera through the motion vectors.

2. The stereo vision system of claim 1, further comprising a power managing unit for selectively supplying power to the stereo matching unit upon the detection of the object within the distance range through the low-resolution distance information.

3. The stereo vision system of claim 1, wherein the image pre-processing unit makes epipolar lines of the right and left images coincide with each other.

4. The stereo vision system of claim 3, wherein the image pre-processing unit rectifies the stereo image of the right and left images so that the epipolar lines of the stereo image of the right and left images are horizontal using rectification parameters of the stereo camera, and corrects a difference between characteristics of the stereo camera and a difference between brightness of the right and left images.

5. The stereo vision system of claim 4, wherein the image pre-processing unit extracts the rectification parameters using a plurality of rectification patterns that are located in front of the stereo camera and parallel to baseline vectors of right and left lenses of the stereo camera, and makes the epipolar lines of the right and left images are horizontal using the rectification parameters at an initial stage.

6. The stereo vision system of claim 5, wherein the image pre-processing unit extracts correspondence pairs for characteristic points of the rectification pattern images and calibrates the stereo camera by matching the correspondence pairs using direct linear transformation (DLT).

7. The stereo vision system of claim 1, wherein the image compressor performs a discrete cosine transform (DCT), a quantization, and a variable length coding (VLC) on the I-frame for the left image to produce a compressed video bitstream corresponding to the I-frame.

8. The stereo vision system of claim 7, wherein the image compressor performs an inverse quantization and an inverse discrete cosine transform (IDCT) on the I-frame to which the quantization has been performed, and stores the I-frame to which the quantization has been performed as a previous I-frame.

9. The stereo vision system of claim 1, wherein the image compressor performs a motion estimation on the P-frame for the right image to extract the motion vector thereof, predicts the motion of the P-frame using the motion vector to produce a motion predicted P-frame, carries out subtraction between the motion predicted P-frame and the P-frame for the right image to produce a difference P-frame, and performs a discrete cosine transform, quantization, and variable length coding on the difference P-frame to produce a video bitstream corresponding to the P-frame for the right image.

10. The stereo vision system of claim 9, wherein the image compressor carries out an inverse quantization and an inverse discrete cosine transform on the difference P-frame to which the quantization has been performed, carries out an addition of the motion predicted P-frame and the difference P-frame to which the inverse discrete cosine transform has been carried out and stores the added result as a previous P-frame image.

11. The stereo vision system of claim 1, wherein the image compressor decodes the encoded P-frame for the right image using a variable length decoder (VLD) to obtain the motion vector, and acquires the low-resolution distance information using the motion vector.

12. The stereo vision system of claim 11, wherein the low-resolution distance information corresponds to a size of a macroblock to be processed in the image compressor.

13. The stereo vision system of claim 9, wherein the image compressor acquires depth information of a disparity for the low-resolution distance information according to a horizontal size of a search range window employed in performing the motion estimation.

14. The stereo vision system of claim 1, wherein the stereo matcher carries out a stereo matching for creating a central disparity image by defining an imaginary image at the centers of the right and left images and creating a disparity between pixels in the right and left images that are determined to be the same object using the central disparity image.

15. The stereo vision system of claim 14, wherein the high-resolution distance information is obtained by performing the stereo matching and then post-processing on distance information of the right and left images, the post-processing including projection, segmentation, and filtering of the right and left images.

16. The stereo vision system of claim 14, wherein the stereo matching includes a dynamic program based stereo matching and/or a block matching based stereo matching.

17. The stereo vision system of claim 1, wherein the coincidence of the epipolar lines of the stereo image is determined by analyzing vertical components of the motion vector.

18. The stereo vision system of claim 2, wherein the power managing unit is configured to supply power to the stereo matcher when the object within the distance range is detected through the low-resolution distance information.

19. A stereo vision processing method for carrying out stereo matching of a stereo image of right and left images captured by a stereo camera, the stereo vision processing method comprising:
pre-processing the stereo image of the right and left images;
acquiring low-resolution distance information for the pre-processed stereo image of the right and left images;
checking detection of an object within a distance range using the low-resolution distance information; and
performing a stereo matching on the right and left images to acquire high-resolution distance information, upon detection of the object,
wherein said acquiring the low-resolution distance information includes:
encoding the right image to a P-frame and the left image to an I-frame;
decoding the P-frame image for the encoded right image using a variable length decoder; and
extracting a motion vector through decoding of the encoded P-frame image, thereby acquiring the low-resolution distance information.

20. The stereo vision processing method of claim 19, wherein pre-processing of the right and left images comprises making epipolar lines of the right and left images coincide with each other.

21. The stereo vision processing method of claim 19, wherein pre-processing of the stereo image of the right and left images comprises rectifying the stereo image of the right and left images so that the epipolar lines of the stereo image of the right and left images are horizontal using rectification parameters of the stereo camera, and correcting a difference between characteristics of right and left lenses of the stereo camera and a difference between brightness of the right and left images.

22. The stereo vision processing method of claim 21, wherein the rectification parameters are extracted using a plurality of calibration patterns that are located in front of the stereo camera and that are parallel to baseline vectors of the stereo camera, so that the epipolar lines of the right and left images are made horizontal using the rectification parameters at an initial stage.

23. The stereo vision processing method of claim 22, wherein rectifying the stereo camera includes extracting correspondence pairs for characteristic points of the plurality of calibration patterns, and calibrating the stereo camera by matching the correspondence pairs using direct linear transformation (DLT).

24. The stereo vision processing method of claim 19, wherein encoding the left image to the I-frame includes performing a discrete cosine transform, quantization, and variable length coding to produce a video bitstream corresponding to the I-frame.

25. The stereo vision processing method of claim 24, wherein the I-frame is subjected to an inverse quantization and inverse discrete cosine transform after being subjected to the quantization, and is stored as a previous I-frame image.

26. The stereo vision processing method of claim 25, wherein encoding the right image to the P-frame includes performing a motion estimation on the P-frame for the right image to extract a motion vector thereof, predicting the motion of the P-frame using the motion vector to produce a motion predicted P-frame, carrying out subtraction between the motion predicted P-frame and the P-frame for the right image to produce a difference P-frame, and performing a discrete cosine transform, a quantization, and a variable length coding on the difference P-frame to produce a video bitstream corresponding to the P-frame for the right image.

27. The stereo vision processing method of claim 26, further comprising, after performing quantization of the P-frame image, carrying out an inverse quantization and an inverse discrete cosine transform of the difference P-frame to which the quantization has been performed, carrying out an addition of the motion predicted P-frame and the difference P-frame to which the inverse discrete cosine transform has been carried out and storing the added result as the previous P-frame image.

28. The stereo vision processing method of claim 19, wherein a disparity for the low-resolution distance information is determined according to a horizontal size of a search range window employed in performing the motion estimation.

29. The stereo vision processing method of claim 19, wherein the coincidence of the epipolar lines for the stereo cameras is determined by analyzing vertical components of the motion vector and is employed to determine the rectification of the stereo camera.

30. The stereo vision processing method of claim 19, wherein performing the stereo matching includes:
creating a central disparity image by defining an imaginary image at the centers of the right and left images; and
creating a disparity between pixels in the right and left images that are determined to be a same object using the central disparity image.

31. The stereo vision processing method of claim 30, wherein the stereo matching includes a dynamic program based stereo matching and/or a block matching based stereo matching.

32. The stereo vision processing method of claim 19, further comprising, after performing the stereo matching, post-processing on distance information of the right and left images, the post-processing including projection, segmentation, and filtering of the right and left images.

33. The stereo vision processing method of claim 19, wherein the stereo matching is performed by a stereo matching device configured to acquire the high-resolution distance information; and wherein the stereo vision processing method further comprises selectively supplying power to the stereo matching apparatus upon the detection of the object within the distance range through the low-resolution distance information.

34. A stereo vision system for performing stereo matching a stereo image of right and left images captured by a stereo camera, the stereo vision system comprising:

an image pre-processing unit for pre-processing the right and left images; and a stereo matching unit for carrying out stereo matching of the right and left images to acquire low-resolution distance information of the right and left images and high-resolution distance information of the right and left images upon detection of an object within a distance range through the low-resolution distance information; and a power managing unit for supplying power to the stereo matching unit upon the detection of the object within the distance range through the low-resolution distance information.

* * * * *